No. 763,460. PATENTED JUNE 28, 1904.
P. J. BUCKLEY.
GAS PRODUCER.
APPLICATION FILED OCT. 29, 1903.
NO MODEL. 2 SHEETS—SHEET 1.

Witnesses:
W. H. Cotton
E. M. Klatcher

Inventor:
Patrick J. Buckley
By Louis R. Gleeson
Att'y.

No. 763,460. PATENTED JUNE 28, 1904.
P. J. BUCKLEY.
GAS PRODUCER.
APPLICATION FILED OCT. 29, 1903.
NO MODEL. 2 SHEETS—SHEET 2.

Witnesses:
W. H. Cotton
E. M. Klatcher

Inventor:
Patrick J. Buckley.
By Louis T. Gleeson
Atty.

No. 763,460. Patented June 28, 1904.

UNITED STATES PATENT OFFICE.

PATRICK J. BUCKLEY, OF WAUKESHA, WISCONSIN.

GAS-PRODUCER.

SPECIFICATION forming part of Letters Patent No. 763,460, dated June 28, 1904.

Application filed October 29, 1903. Serial No. 178,957. (No model.)

*To all whom it may concern:*

Be it known that I, PATRICK J. BUCKLEY, a citizen of the United States, and a resident of Waukesha, county of Waukesha, and State of Wisconsin, have invented certain new and useful Improvements in Gas-Producers, of which the following is a specification, and which are illustrated in the accompanying drawings, forming a part thereof.

The invention relates to an apparatus for the manufacture of producer-gas from peat; and its purpose is to provide a device of this kind which shall not only be capable of manufacturing gas from dry peat, but will utilize the heat developed in the operation in the preparation of green peat. This object is attained in the structure hereinafter described and which is illustrated in the accompanying drawings, in which—

Figure 1:
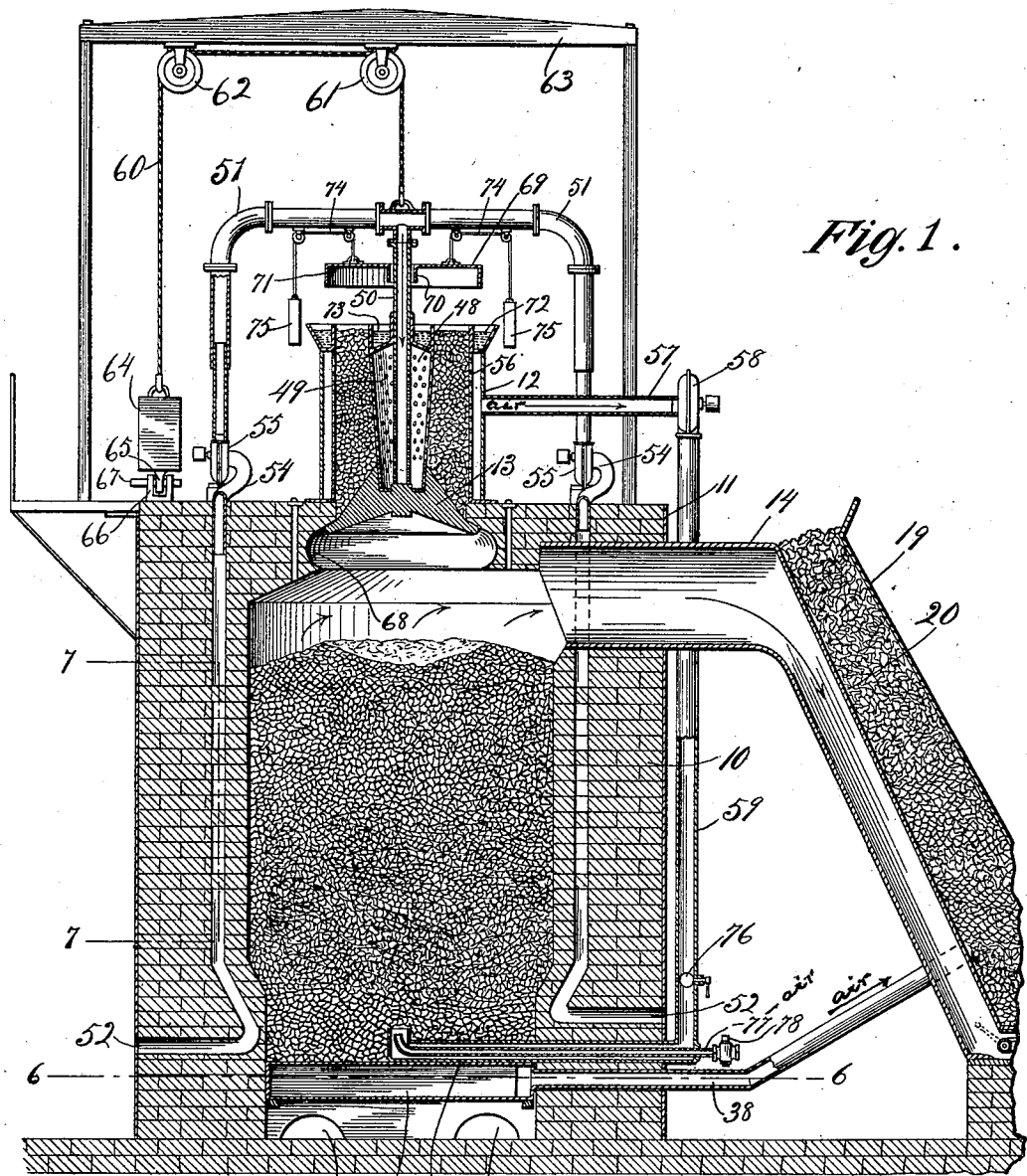
Figure 2:
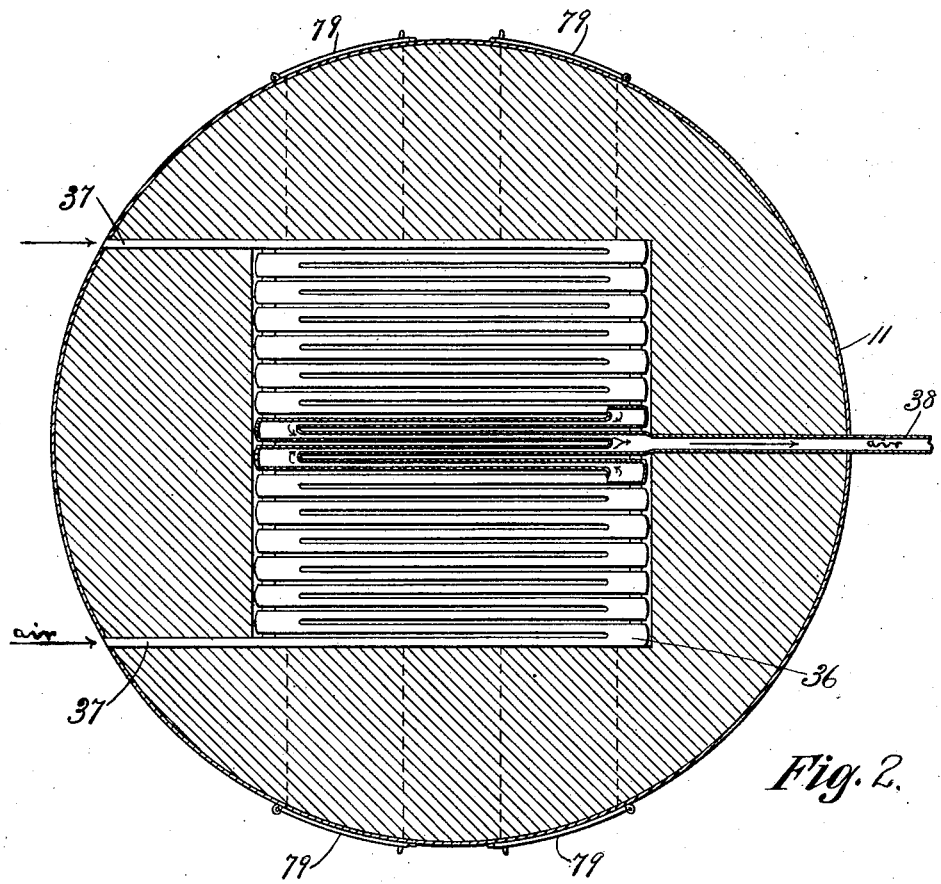
Figure 3:
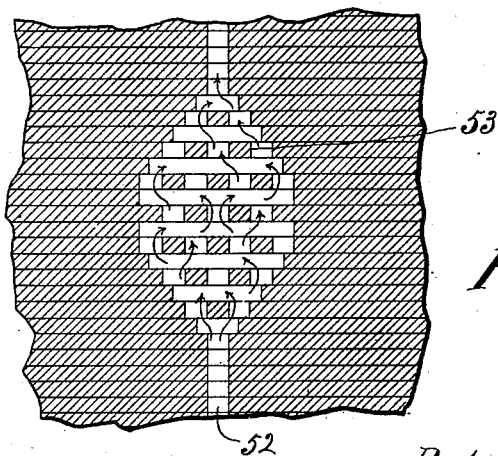

Figure 1 is a central vertical section through the furnace and a portion of the drier mechanism. Fig. 2 is a plan section of the furnace on the line 6 6 of Fig. 2. Fig. 3 is a detail section of one of the walls of the furnace.

The furnace 10 is of masonry and is preferably round and reinforced or strengthened by an outer steel shell 11. A bell-form feed-hopper 12 is located above the chamber of the furnace, and its bottom is closed by a downwardly-opening cone-shaped valve 13. Gas generated within the chamber of the furnace is carried by means of a conduit 14 to any desired receiver, as shown to a drier for the material to be used in the furnace.

The feed-hopper 12 constitutes an auxiliary drier. To this end it is provided with a central chamber 48, having perforated walls 49, and to this chamber hot air is led by means of a pipe 50 in connection with branch pipes 51 51, leading from chambers formed within the side walls of the furnace. These latter chambers are in communication with the outside atmosphere through the induction-pipes 52 52, and for the purpose of strengthening the walls of the furnace as well as for the purpose of increasing the radiating-surfaces over which the air passes the bricks may be set through the air-chambers in checkered form, as shown at 53 in Fig. 7. The eduction-pipes 54 54 of the air-chambers within the walls of the furnace lead to suction-fans 55 55, the discharge-nozzles of which are in telescopic engagement with the branch pipes 51 51. The feed-hopper is provided with double walls, the inner one, 56, being freely perforated and spaced apart from the outer wall, so as to form an annular chamber. A pipe 57 leads from this chamber to a suction-fan 58, which discharges the air through a pipe 59 to the chamber of the furnace, thereby providing the oxygen required for maintaining the combustion necessary to produce the destruction of the peat with the liberation of its gases and the chemical recombinations, which result in the formation of the gas. The blowers or suction-fans 55 and 58 are driven at sufficient speed to insure the rapid circulation of air through the hopper and its chambers without the development of a material pressure within the same.

The valve 13 is preferably attached to the lower end of the pipe 50, and the telescopic connection between the branch pipes 51 and the discharge-nozzles of the fans 55 55 is provided in order to permit the raising and lowering of the valve. This valve and its appurtenances are controlled by a cable 60, running over sheaves 61 and 62, supported by a frame 63, rising from the top of the furnace. The cable 60 preferably carries a counterweight 64 and a loop 65, which may be secured to the eyebolt 66 by means of a pin 67, so as to lock the valve 13 in its closed position.

In order to provide for a substantially uniform distribution of peat dropped from the hopper into the chamber of the furnace, the passage leading from the bottom of the hopper to such chamber is provided with vertically-concaved walls, as shown at 68, so that as the valve 13 opens the material is deflected by its inclined upper surface into the recess formed by the concavity of the walls 68 and filling the curvature of these walls is thrown toward the center of the furnace-chamber. The valve 13 descending below the passage leading to the furnace-chamber, the material sliding from its upper surface is thrown outwardly toward the side walls of the furnace. By this arrangement a proper distribution of the material is secured without resorting to any stoking operation.

A cover 69 is provided for the hopper 12 and has downwardly-extending inner and outer flanges 70 and 71, which enter water seals 72 and 73, thereby preventing the escape of hot air from or the inflow of cold air to the interior of the hopper. The cover 69 is supported and controlled by means of cables 74 74, running through suitable eyes secured to the branch pipes 51 51, each of these cables being provided with a counterweight 75 75.

Should the supply of moisture through the pipe 59 be excessive, it may be in part cut off and discharged by means of a vent-cock 76. Should the supply of air be less than the requirements of the furnace, a supplemental supply is provided through a pipe 77, entering the furnace through the pipe 59 and being open to outside atmosphere, a valve 78 being provided for closing it when such supplemental air-supply is not required.

The grate-bars 36 of the furnace are preferably tubular, so that air may circulate through them, entering through the pipes 37 and being discharged through the pipe 38, which may discharge it into the open air or lead it to any use desired to be made of it.

The producer is put in operation by first kindling a fire within the chamber of the furnace and then introducing a supply of dry peat, the moisture having been reduced, preferably, to about six per cent. of the weight of the material. The hopper 12 is filled with peat partially dried, its moisture having been reduced to less than fifty per cent. and preferably to approximately twenty-five per cent. The fans 55 55 being set in motion, air is forced through this partially-dried peat and extracts the moisture therefrom, so as to reduce it to approximately six per cent., and this moisture is carried with the air into the chamber of the furnace through the pipe 59, thereby providing the oxygen required for combustion and the hydrogen necessary for the production of gas in combination with the carbon of the peat.

While I have referred to the device as being adapted for the treatment of peat and the manufacture of gas therefrom, it may obviously be used for the treatment of other wet materials from which gas may be produced.

At 79 are shown doors for the ash-pit. In the operation of the producer these doors remain closed, air being admitted to the chamber of the furnace only above the grate.

By the construction disclosed and described the use of a separate steam-generator is avoided. The air passed through the feed-hopper may be heated to a high temperature and will not only evaporate the moisture in the peat, but will convert it into steam, thereby providing the hydrogen necessary to enrich the gas. By the use of a high temperature in the hopper there will be some gas generated, especially $CO_2$, and this will be delivered to the combustion-chamber of the furnace and will there enter into chemical combinations and be recovered.

A further advantage of the structure is found in the fact that much of the heat which would otherwise escape through the furnace-walls is taken up by the air and returned to the combustion-chamber, thereby not only saving it, but securing the advantage of a hot instead of a cold air supply to support combustion.

I claim as my invention—

1. In a gas-producer, in combination, a furnace for producing gas and having an air-chamber in its walls, a hopper for feeding the furnace and having a cover, a conduit leading from the air-chamber to the hopper, and a conduit leading from the hopper to the combustion-chamber of the furnace.

2. In a gas-producer, in combination, a furnace for producing gas and having an air-chamber in its wall, a feed-hopper above the furnace and having a central chamber with perforate walls and double outer walls the inner one being perforated, a conduit leading from the air-chamber to the central chamber of the hopper, and a conduit leading from the outer casing of the hopper to the combustion-chamber of the furnace.

3. In a gas-producer, in combination, a producer-furnace, a closed hopper for feeding the furnace, and means for heating air by the furnace and passing it through the hopper and into the combustion-chamber of the furnace.

4. In a gas-producer, in combination, a producer-furnace, a receptacle for green material, means for passing an air-current in proximity to the furnace and thence through the receptacle and into the combustion-chamber of the furnace.

5. In a gas-producer, in combination, a producer-furnace, a feed-hopper therefor having a discharge-valve, an air-pipe entering the hopper and carrying the valve, and an air-pipe leading from the hopper to the combustion-chamber of the furnace.

6. In a gas-producer, in combination, a producer-furnace having air-chambers in its walls, a feed-hopper having a reciprocating discharge-valve, an air-pipe entering the hopper and carrying the valve, eduction-pipes leading from the air-chambers, branch pipes connected with the valve-carrying pipe and telescopically entering the eduction-pipes, and a pipe leading from the hopper to the combustion-chamber of the furnace.

7. In a gas-producer, in combination, a producer-furnace, a receptacle for green material, means for passing an air-current in proximity to the furnace and thence under pressure through the receptacle and into the combustion-chamber of the furnace.

8. In a gas-producer, in combination, a furnace for producing gas and having an air-chamber in its wall, a feed-hopper above the furnace and having a central chamber with perforate walls and double outer walls, the inner one being perforated, a blower, a conduit leading from the air-chamber to the blower, a conduit leading from the blower to the central chamber of the hopper, and a conduit leading from the outer casing of the hopper to the combustion-chamber of the furnace.

9. In a gas-producer, in combination, a furnace, for producing gas and having an air-chamber in its wall, a feed-hopper above the furnace and having a central chamber with perforate walls and double outer walls, the inner one being perforated, a blower, a conduit leading from the air-chamber to the blower, a conduit leading from the blower to the central chamber of the hopper, a conduit leading from the outer casing of the hopper to the blower, and a conduit leading from the blower to the combustion-chamber of the furnace.

10. In a gas-producer, in combination, a furnace for producing gas and having an air-chamber in its wall, a feed-hopper above the furnace and having an inner chamber with perforate walls and having double outer walls spaced apart to form an annular chamber, the inner of said walls being perforated, a conduit leading from the air-chamber in the furnace-wall to one of the named hopper-chambers, and a conduit leading from the other named hopper-chamber to the combustion-chamber of the furnace.

11. In a gas-producer, in combination, a producer-furnace, a feed-hopper therefor having a central and an outer air-chamber the adjacent walls of which are perforated, a conduit leading to one of said air-chambers, and a conduit leading from the other of said air-chambers to the combustion-chamber of the furnace.

12. In a gas-producer, in combination, a producer-furnace, a feed-hopper therefor having a central and an outer air-chamber adjacent walls of which are perforated, a conduit leading to one of said air-chambers, a conduit leading from the other of said air-chambers to the combustion-chamber of the furnace, and means for forcing air through the hopper.

13. In a gas-producer, in combination, a producer-furnace having an air-chamber in its walls, a feed-hopper for the furnace having a central and an outer air-chamber adjacent walls of which are perforated, a conduit leading from the air-chamber in the furnace-walls to one of the named chambers of the hopper, a conduit leading from the other named chamber of the hopper to the combustion-chamber of the furnace, and means for forcing air through the air-chamber, the named conduits and the hopper.

PATRICK J. BUCKLEY.

Witnesses:
WILLIAM WELLES HOYT,
LOUIS K. GILLSON.